(No Model.) 4 Sheets—Sheet 1.
G., J. G. & M. O. REHFUSS.
MACHINE FOR LACING JACQUARD CARDS.

No. 453,024. Patented May 26, 1891.

Witnesses:
John Wilson Orr,
John J. Geary.

Inventors.
George Rehfuss,
John G. Rehfuss &
Martin O. Rehfuss
by their Attorneys
Howson & Howson (No Model.) 4 Sheets—Sheet 2.
G., J. G. & M. O. REHFUSS.
MACHINE FOR LACING JACQUARD CARDS.

No. 453,024. Patented May 26, 1891.

(No Model.) 4 Sheets—Sheet 3.
G., J. G. & M. O. REHFUSS.
MACHINE FOR LACING JACQUARD CARDS.
No. 453,024. Patented May 26, 1891.
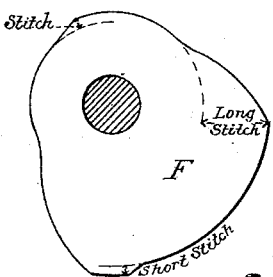
FIG. 10.
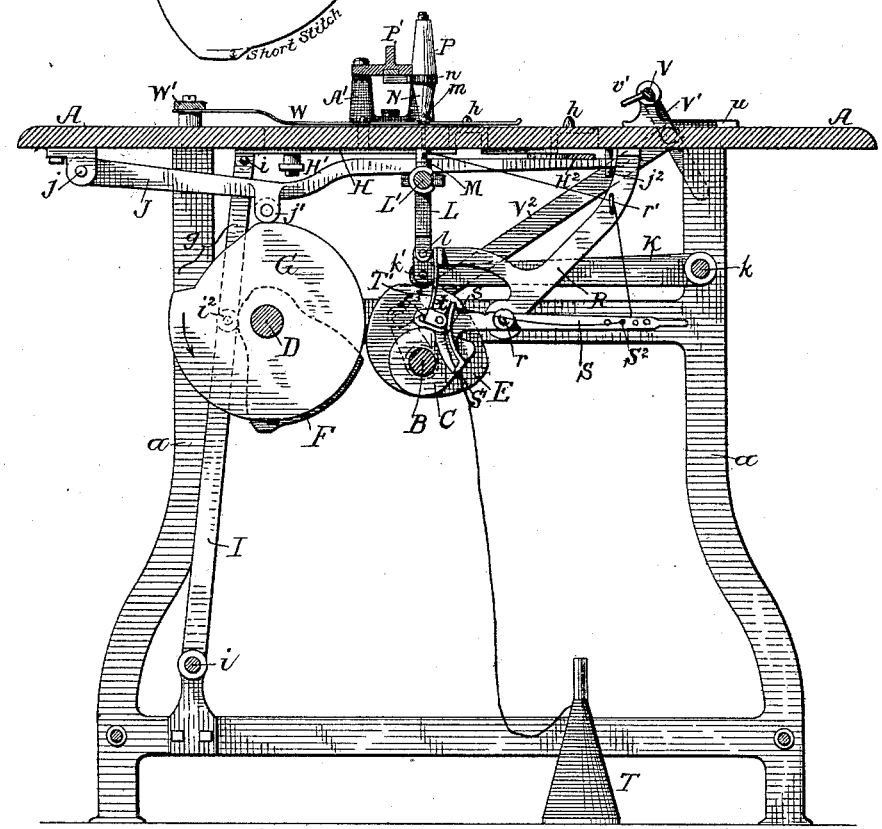
FIG. 3.
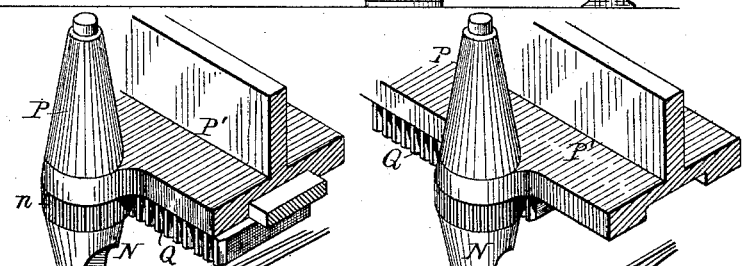
FIG. 8. FIG. 7.
Witnesses:
Inventors
G. Rehfuss,
J. G. Rehfuss &
M. O. Rehfuss
by their Attorneys
Howson & Howson (No Model.) 4 Sheets—Sheet 4.
G., J. G. & M. O. REHFUSS.
MACHINE FOR LACING JACQUARD CARDS.
No. 453,024. Patented May 26, 1891.
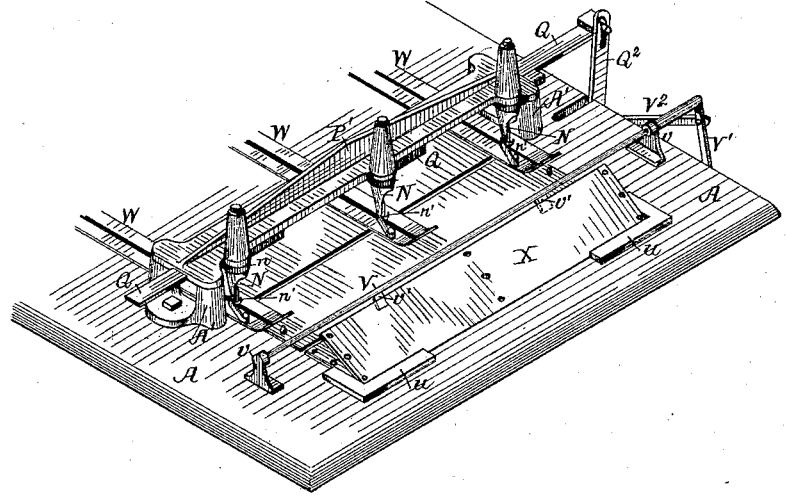
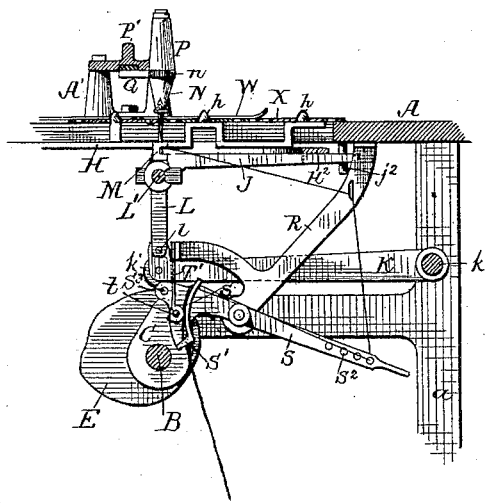
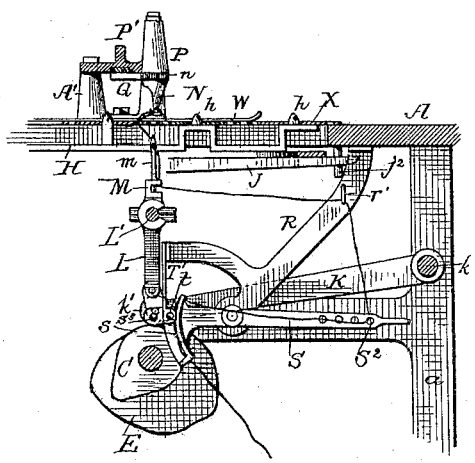
Witnesses:
John Wilson Orr
John J. Geary
Inventors
George Rehfuss
John G. Rehfuss &
Martin O. Rehfuss
by their Attorneys
Howson & Howson

UNITED STATES PATENT OFFICE.

GEORGE REHFUSS, JOHN GEORGE REHFUSS, AND MARTIN O. REHFUSS, OF PHILADELPHIA, PENNSYLVANIA, ASSIGNORS TO WILLIAM P. UHLINGER, OF SAME PLACE.

MACHINE FOR LACING JACQUARD CARDS.

SPECIFICATION forming part of Letters Patent No. 453,024, dated May 26, 1891.

Application filed June 8, 1889. Serial No. 313,569. (No model.)

*To all whom it may concern:*

Be it known that we, GEORGE REHFUSS, JOHN GEORGE REHFUSS, and MARTIN O. REHFUSS, all citizens of the United States, and residents of Philadelphia, Pennsylvania, have invented certain Improvements in Card-Lacing Machines, of which the following is a specification.

The object of our invention is to construct a machine for lacing the cards of Jacquard apparatus used in connection with looms.

Figure 1:
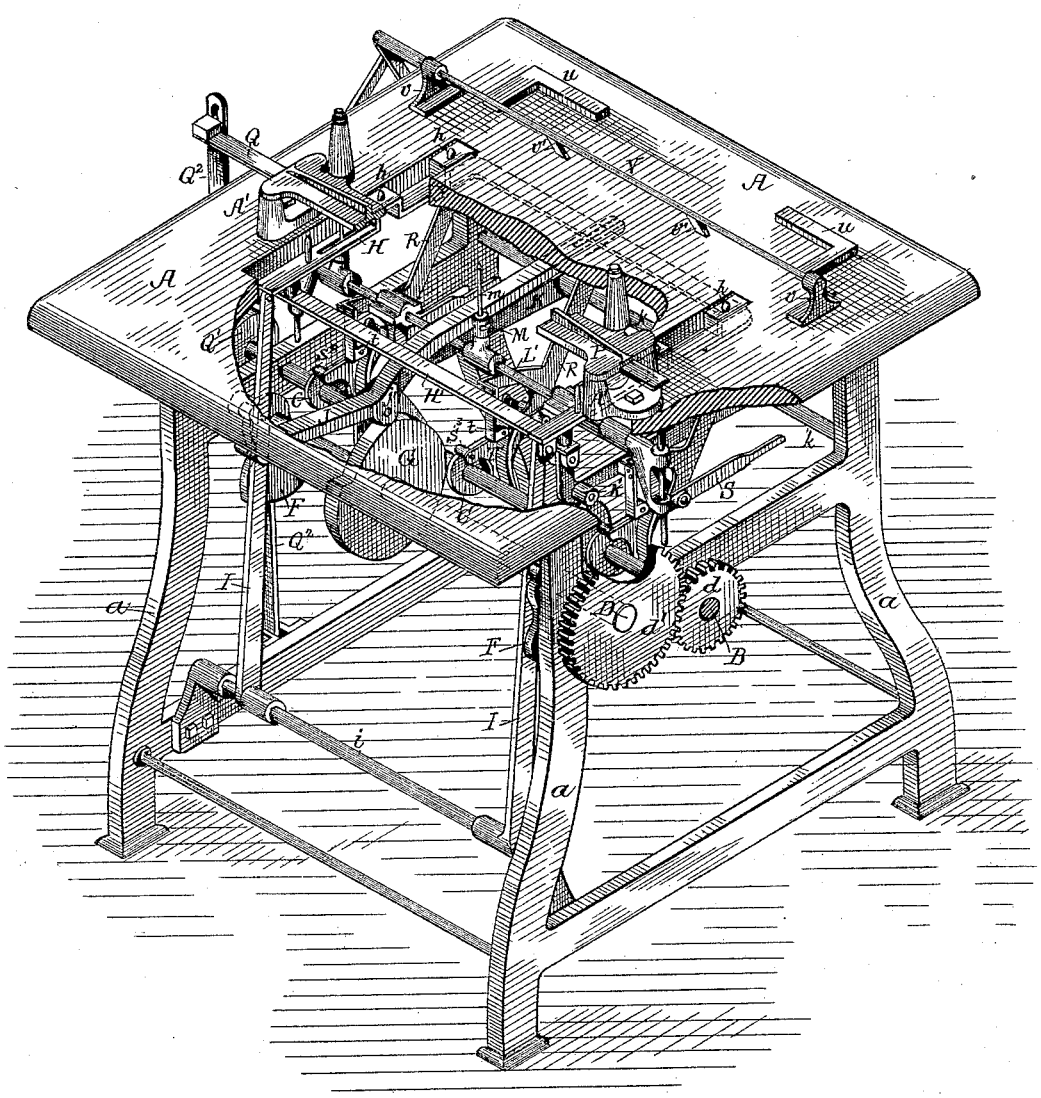
Figure 2:
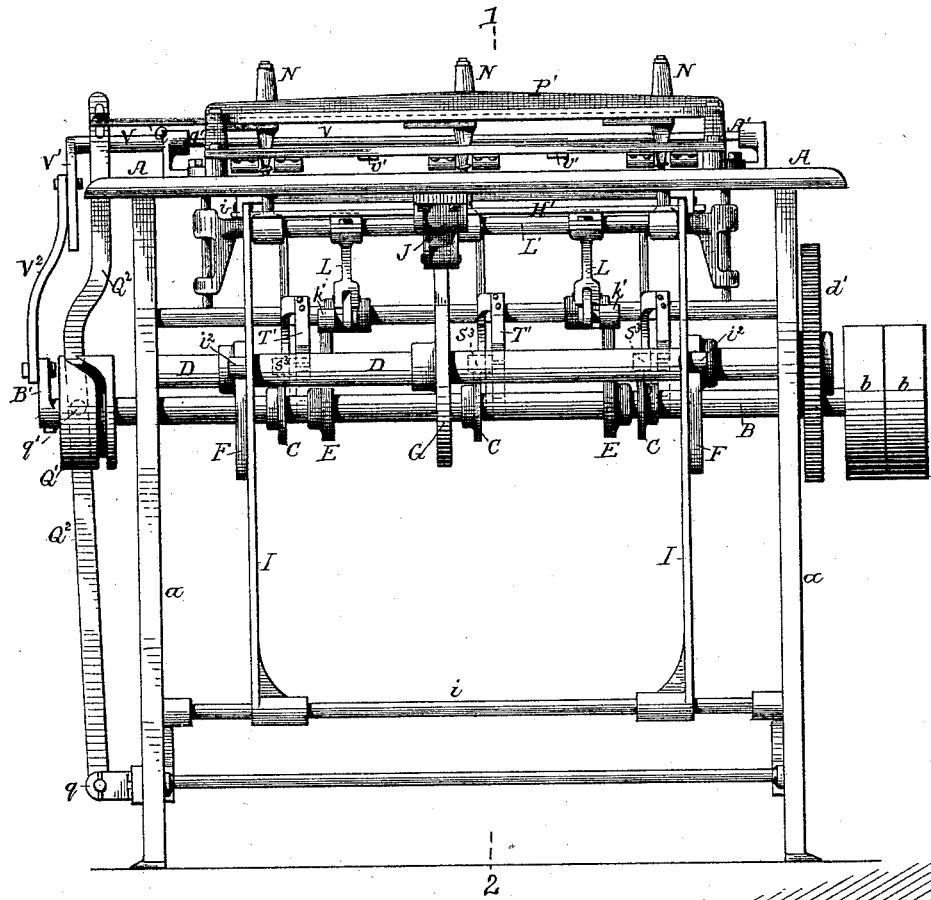
Figure 9:
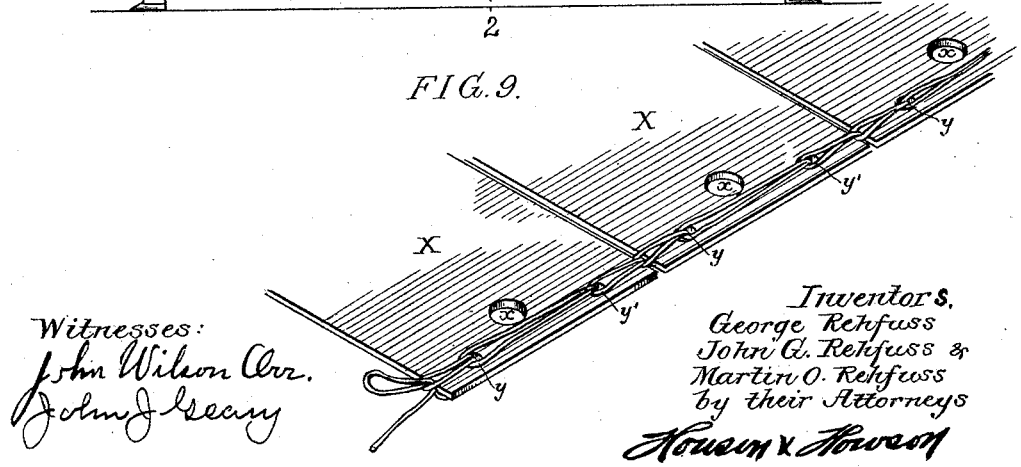

In the accompanying drawings, Figure 1 is a perspective view of our improved machine with part of the bed-plate cut away. Fig. 2 is a side view. Fig. 3 is a section on the line 1 2, Fig. 2. Fig. 4 is a perspective view of part of the machine, showing the loopers. Figs. 5 and 6 are sectional views showing the needle in two different positions. Figs. 7 and 8 are detached perspective views in diagram, showing the needle and loopers forming the stitch for lacing the card. Fig. 9 is a perspective view showing portions of the cards united by stitching, and Fig. 10 is a side view of the feed-cam.

Referring to Figs. 1, 2, and 3, A is the bed-plate of the machine, supported by the frame $a\ a$, tied together in any suitable manner. In bearings on the frame is the driving-shaft B, having fast and loose pulleys $b\ b$ and provided with needle-operating cams E and tension-cams C. The feed-shaft D is geared to the driving-shaft by a pinion $d$ and gear-wheel $d'$. On this shaft D are mounted the feed-cams F and G, the cam F being the cam for giving the forward motion to the feed and the cam G for lifting the feed-bar into engagement with the cards, as described hereinafter. The cards to be laced, it will be understood, are cards used in connection with Jacquard mechanism for looms or any weaving or knitting mechanism where cards would come in play. The cards are stitched at three places—that is, at each end and at the middle—and therefore we have shown the machine with three needles and loopers and a feed common to the same. As shown in Fig. 9, each card is first perforated at $x$ on the longitudinal center line of the card, and also perforated at $y\ y'$ near each edge, so that the feed must be an irregular feed—that is to say, two stitches must be short stitches and one stitch a long stitch. The feed-cam F, Fig. 10, is so cut that the above-described operation will take place.

H are the feed-bars, one at each side of the machine, and are provided with pins $h\ h$, which engage with the orifices $x$ in the cards X. These feed-bars are connected together by transverse rods $H'\ H^2$. The bars H H are attached to vertical rocking bars I, secured to a shaft $i$. The shaft is pivoted to the frame and the bars I have rollers $i^2$, which bear against the periphery of the feed-cams F F.

J is a lifter-bar pivoted at $j$ to the under side of the bed-plate A and has a roller $j'$, which bears on the periphery of the cam G. This bar J is guided at its outer end by a pin $j^2$, which passes through a slot in the end of the bar, and attached to the outer ends of the feed-bars H H is a cross-bar $H^2$, which rests upon the bar J, so that when the notch $g$ in the cam comes under the roller $j'$ the bar J will drop, and consequently the feed-bars H will likewise drop and the pins will be clear of the cards. The cam F is so timed that during the period while the feed-bars are out of engagement with the cards they are returned to their normal position and the pins allowed to enter other openings in the cards, and the cut of the balance of the cam is so regulated in respect to the needle that the cards will be fed irregular distances, first sufficient for a short stitch, then a long stitch, and then a short stitch, as indicated in Fig. 10, after which the feed-bar is returned and the above operation is repeated.

Referring to the sewing mechanism, K are the needle-levers, pivoted at $k$ to the frame of the machine. Each lever has a roller $k'$, adapted to bear upon the face of its cam E. Pivoted at $l$ to each of these levers K is a link L, carrying a rod $L'$. On this rod $L'$ are the needle-bars M, carrying at their upper ends the needles $m$, so that as the shaft B revolves the needles will be reciprocated in time with the feeding mechanism.

Situated directly above each needle is a looper N. (Clearly shown in Figs. 7 and 8.)

This looper is mounted in a bearing P on a cross-frame P', secured to brackets A' on the frame of the machine.

Sliding on the under side of the bar P' is a toothed rack Q, the teeth of which engage with teeth $n$ on the periphery of each looper N. This rack Q is vibrated by a cam Q' on the shaft B through the medium of a lever $Q^2$, pivoted at $q$ to the frame of the machine. This lever has a pin $q'$, which is adapted to a groove in the cam, so that as the shaft B revolves, owing to the curvature of its groove, it will vibrate the rack and thus revolve the loopers in time with the needle mechanism and the feed. As the needle, which is an eye-pointed needle, projects into the looper and through a loop, as shown in Fig. 8, the looper-needle $n'$ engages with the thread on the needle $m$, Fig. 8, and as the looper revolves its loop drops and a new loop is formed, making the stitch shown in Fig. 9.

Pivoted at $r$ to a bracket R on the under side of the bed-plate A is a tension-lever S, having an eccentric face $s$, over which the thread is guided through an eye in the projection S', from the spool or bobbin T, to and through an eye in the upper portion of the segment to the opposite end of the lever S. The thread passes through one of the eyes $s^2$ up through an eye $r'$ on the bracket R to the needle-bar M. A spring T' on one arm of the bracket R carries at its lower end a roller $t$, which rests against the thread on the segmental face $s$ of the lever S, and after the loop is formed and the needle $n'$ on the looper engages the thread the lever S is moved, putting the necessary tension on the thread or cord by the cam C striking a pin $s^3$ on the end of the lever S, as shown in Fig. 5, after which the lever returns to its normal position owing to its weight and the tension of the thread.

W are the flexible presser-feet, under which the cards are fed by the feed-bars H H, these presser-feet being secured to a bar W', attached to the bed of the machine.

$u$ $u$ are right-angled ribs on the bed, and act as rests when the cards are fed to the machine, as shown in Fig. 4.

V is a rock-shaft journaled in bearings $v$ and having lugs $v'$ $v'$, on which rests the edge of each card as it is placed in position on the machine. The shaft V has a lever V' at its outer end, which is attached to a crank B' on the shaft B, Fig. 2, by a rod $V^2$. By this means the cards are dropped into position at the proper moment to be fed to the needles by the feed-bars H, described above.

We claim as our invention—

1. The combination, in a card-lacing machine, of the series of vertical reciprocating needles $m$, loopers N, acting in conjunction with said needles, mechanism, substantially as described, for operating said needles and loopers, a feed-table, reciprocating feed-bars H, pins $h$ thereon engaging with the cards to be laced, levers I and J, connected to said feed-bars, a cam F, having two short throws and one long throw, said cam acting directly upon the lever I, imparting an irregular feed motion to the feed-bars, and a lifting-cam G, acting upon the lever J to lift the feed-bars into engagement with the cards to be laced, substantially as specified.

2. The combination, in a card-lacing machine, of the needles and loopers, mechanism for operating the same, the feed-bars H, having pins $h$ engaging with the cards to be laced, the lever I, connected to the feed-bars, a cam F, of a shape substantially as specified, acting upon said lever I, a pivoted lever J, on which the outer ends of the feed-bars are supported, and a cam G, of a shape substantially as set forth, acting on the lever J to raise and lower the feed-bars H, substantially as described.

3. The combination, in a card-lacing machine, of the feed-table, slots therein, feed-bars H, adapted to said slots, said feed-bars having pins $h$ engaging with the cards to be laced, two cams F and G for actuating said feed-bars in a manner substantially as described, vertical reciprocating needle-bars, needles thereon, levers connected to said needle-bars, cams acting on said levers, a cross-frame P', bearings P thereon, loopers N, adapted to said bearings, a rack-bar Q, engaging with the loopers, a lever connected to the rack-bar, and a cam Q', acting upon said lever in time with the needle mechanism and feed mechanism, substantially as specified.

In testimony whereof we have signed our names to this specification in the presence of two subscribing witnesses.

GEORGE REHFUSS.
JOHN GEORGE REHFUSS.
MARTIN O. REHFUSS.

Witnesses:
HARRY SMITH,
HENRY HOWSON.